United States Patent
Seo et al.

(10) Patent No.: US 8,631,097 B1
(45) Date of Patent: Jan. 14, 2014

(54) METHODS AND SYSTEMS FOR FINDING A MOBILE AND NON-MOBILE PAGE PAIR

(71) Applicant: Google Inc., Mountain View, CA (US)

(72) Inventors: Minkoo Seo, KyungGiDo (KR); Jaeho Kang, Seoul (KR); Seokgyo Jung, Seoul (KR); Junyoung Lee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/649,190

(22) Filed: Oct. 11, 2012

(51) Int. Cl.
*G06F 15/16* (2006.01)

(52) U.S. Cl.
USPC .............................. 709/219; 709/203; 709/246

(58) Field of Classification Search
USPC .......................................... 709/219, 203, 246
See application file for complete search history.

(56) References Cited

U.S. PATENT DOCUMENTS

| 6,324,544 B1 | 11/2001 | Alam et al. |
| 6,882,999 B2 * | 4/2005 | Cohen et al. ................ 707/694 |
| 7,376,752 B1 * | 5/2008 | Chudnovsky et al. ........ 709/245 |
| 7,779,408 B1 | 8/2010 | Papineau |
| 7,966,310 B2 * | 6/2011 | Sullivan et al. .............. 707/709 |
| 8,307,073 B1 * | 11/2012 | Brundage et al. ............ 709/224 |
| 2008/0222273 A1 | 9/2008 | Lakshmanan et al. |
| 2009/0005010 A1 | 1/2009 | Dote et al. |
| 2009/0005032 A1 | 1/2009 | Lunati et al. |
| 2009/0222721 A1 | 9/2009 | Parkinson |
| 2010/0274870 A1 * | 10/2010 | Cremin et al. ................ 709/217 |
| 2011/0099294 A1 * | 4/2011 | Kapur et al. .................. 709/246 |
| 2013/0212220 A1 * | 8/2013 | Fukuda et al. ................ 709/217 |

OTHER PUBLICATIONS

Pierre Far, "Making Websites Mobile Friendly," Google Webmaster Central Blog, posted Feb. 22, 2011, 3 pages. http://googlewebmastercentral.blogspot.com/2011/02/making-websites-mobile-friendly.html (accessed Oct. 10, 2012).

Jun Mukai, "Running desktop and mobile versions of your site," Google Webmaster Central Blog, posted Nov. 18, 2009, 2 pages. http://googlewebmastercentral.blogspot.com/2009/11/running-desktop-and-mobile-versions-of.html (accessed Oct. 10, 2012).

* cited by examiner

*Primary Examiner* — Duyen Doan
(74) *Attorney, Agent, or Firm* — Troutman Sanders LLP; James E. Schutz; Jay R. Anderson

(57) ABSTRACT

Exemplary embodiments provide systems and methods for determining a mobile URL from a specified non-mobile URL or vice versa. In various embodiments, the determined mobile URL (or the determined non-mobile URL) may be tested to verify that it corresponds to the specified non-mobile URL (or mobile URL). In various embodiments, after one or more sets of mobile and corresponding non-mobile URLs are identified, the differences in the mobile and corresponding non-mobile URLs may be analyzed to create or define rules for converting from a non-mobile URL to a mobile URL, and vice versa. The rules may then be employed by search services, mobile device applications, etc. to synthesize or search for a mobile URL that corresponds to a give non-mobile URL, and vice versa.

18 Claims, 7 Drawing Sheets

| URL Pairs | Set of Character Strings in a URL | Matching Strings in URL Pairs | Placeholders and Mapping |
|---|---|---|---|
| www.nfl.com/news/abc123<br>m.nfl.com/news/abc123<br>_421_ | {www., nfl.com, news, abc123}<br>{m. nfl.com, news, abc123}<br>_422_ | {www., nfl.com, news, abc123}<br>{m., nfl.com, news, abc123}<br>_423_ | www.const_1/const_2/const_3<br>_maps to_<br>m.const_1/const_2/const_3<br><br>const_1 = nfl.com<br>const_2 = news<br>const_3 = abc123<br>_424_ |
| www.nfl.com/news/abc123<br>m.nfl.com/mobile/abc123<br>_426_ | {www., nfl.com, news, abc123}<br>{m. nfl.com, mobile, abc123}<br>_427_ | {www., nfl.com, news, abc123}<br>{m., nfl.com, mobile, abc123}<br>_428_ | www.const_1/news/const_2<br>_maps to_<br>m.const_1/mobile/const_2<br><br>const_1 = nfl.com<br>const_2 = abc123<br>_429_ |
| www.nfl.com/news/abc234<br>m.nfl.com/mobile/abc456<br>_431_ | {www., nfl.com, news, abc234}<br>{m. nfl.com, mobile, abc456}<br>_432_ | {www., nfl.com, news, abc234}<br>{m., nfl.com, mobile, abc456}<br>_433_ | www.const_1/news/const_2234<br>_maps to_<br>m.const_1/mobile/const_2456<br><br>const_1 = nfl.com<br>const_2 = abc<br>_434_ |

| | 436 | 438 | 440 | 442 |
|---|---|---|---|---|
| | URL Pairs | Set of Character Strings in a URL | Matching Strings in URL Pairs | Placeholders and Mapping |
| | www.nfl.com/news/abc123<br>m.nfl.com/news/abc123<br>_445_ | {www., nfl.com, news, abc123}<br>{m. nfl.com, news, abc123}<br>_446_ | {www., nfl.com, news, abc123}<br>{m., nfl.com, news, abc123}<br>_447_ | www.const_1/const_2/const_3<br>_maps to_<br>m.const_1/const_2/const_3 _448_<br>const_1 = nfl.com<br>const_2 = news<br>const_3 = abc123 |
| | www.nfl.com/news/abc124<br>m.nfl.com/news/abc124<br>_450_ | {www., nfl.com, news, abc124}<br>{m. nfl.com, news, abc124}<br>_451_ | {www., nfl.com, news, abc124}<br>{m., nfl.com, news, abc124}<br>_452_ | www.const_1/const_2/const_3<br>_maps to_<br>m.const_1/const_2/const_3 _453_<br>const_1 = nfl.com<br>const_2 = news<br>const_3 = abc124 |
| | www.nfl.com/news/abc234<br>m.nfl.com/news/abc234<br>_455_ | {www., nfl.com, news, abc234}<br>{m. nfl.com, news, abc234}<br>_456_ | {www., nfl.com, news, abc234}<br>{m., nfl.com, news, abc234}<br>_457_ | www.const_1/const_2/const_3<br>_maps to_<br>m.const_1/const_2/const_3 _458_<br>const_1 = nfl.com<br>const_2 = news<br>const_3 = abc234 |

FIG. 5A

| URL Pairs | Set of Character Strings in a URL | Matching Strings in URL Pairs | Placeholders and Mapping |
|---|---|---|---|
| www.nfl.com/news/abc123<br>m.nfl.com/mobile/abc123 _470_ | {www., nfl.com, news, abc123}<br>{m. nfl.com, mobile, abc123} _471_ | {www., nfl.com, news, abc123}<br>{m., nfl.com, mobile, abc123} _472_ | www.const_1/news/const_2<br>_maps to_<br>m.const_1/mobile/const_2 _473_<br>const_1 = nfl.com<br>const_2 = abc123 |
| www.nfl.com/news/bcd234<br>m.nfl.com/mobile/bcd234 _475_ | {www., nfl.com, news, bcd234}<br>{m. nfl.com, mobile, bcd234} _476_ | {www., nfl.com, news, bcd234}<br>{m., nfl.com, mobile, bcd234} _477_ | www.const_1/news/const_2<br>_maps to_<br>m.const_1/mobile/const_2 _478_<br>const_1 = nfl.com<br>const_2 = bcd234 |
| www.nfl.com/news/cdefg<br>m.nfl.com/mobile/cdefg _480_ | {www., nfl.com, news, cdefg}<br>{m. nfl.com, mobile, cdefg} _481_ | {www., nfl.com, news, cdefg}<br>{m., nfl.com, mobile, cdefg} _482_ | www.const_1/news/const_2<br>_maps to_<br>m.const_1/mobile/const_2 _480_<br>const_1 = nfl.com<br>const_2 = cdefg |

FIG. 5B

METHODS AND SYSTEMS FOR FINDING A MOBILE AND NON-MOBILE PAGE PAIR

FIELD

This disclosure relates to mobile websites, and more particularly, to determining the URL of a mobile website based on the URL of the corresponding non-mobile website, and vice versa.

BACKGROUND

Catering to the ongoing proliferation of mobile devices, especially smart phones, webmasters typically create and manage both desktop (also referred to as non-mobile) and mobile versions of a web site.

A common problem for sites that provide both mobile and non-mobile versions of their content is there is no automatic redirection from one version to another. For example, many sites provide no redirection for a desktop user agent from the site's mobile uniform resource locator (URL) to its desktop URL, and no redirection for a mobile user agent from the desktop URL to the mobile URL.

Thus, the mobile version of the site may appear for a user on a desktop computer, or the desktop version of the site may appear when a user finds and accesses the site from a mobile device. And, even after realizing that a version of a web site that is incorrect for the accessing device is being displayed, a user cannot easily access the correct version because web sites typically do not provide links or controls to move from the non-mobile to the mobile version, and vice versa. For the few websites that use exactly the same directory structure to organize their non-mobile and mobile pages, so as to exactly map the names of their non-mobile URLs to the names of their mobile URLs by only substituting "m." for "www." at the beginning of the name (e.g. "www.aaaa.com/x/y/z/123" and "m.aaaa.com/x/y/z/123"), a user or system may easily guess the correct corresponding mobile and non-mobile page names. Most websites, however, use differing directory structures and change more than a single character field between corresponding mobile and non-mobile page names, which makes this technique ineffective.

The present disclosure provides for, among other things, determining a mobile URL that corresponds to a non-mobile URL, and vice versa.

SUMMARY OF THE DISCLOSURE

The present disclosure describes, among things, methods and systems that perform operations that include identifying a mobile URL associated with a mobile version of a web page that corresponds to a non-mobile URL associated with a non-mobile version of the web page, identifying a matching character string that appears in both the mobile URL and the non-mobile URL, defining an expression that specifies the matching character string, and defining a rule for mapping an input non-mobile URL to an output mobile URL, based on the expression.

Other variants described include methods and systems that perform operations that include defining a first set of URL tokens from a non-mobile URL of a non-mobile web page having first content, defining a second set of URL tokens from a mobile URL of a mobile web page having second content, determining whether the second set of URL tokens corresponds to the first set of URL tokens, if the second set of URL tokens corresponds to the first set of URL tokens, then determining whether the first content corresponds to the second content, and if the first content corresponds to the second content, then indicating that the mobile URL corresponds to the non-mobile URL.

Still other variants described include non-transitory computer-readable medium that include instructions and systems that execute the instructions. In such variants, a processor may execute the instructions to perform operations comprising, among other things, identifying a mobile URL associated with a mobile version of a web page that corresponds to a non-mobile URL associated with a non-mobile version of the web page, identifying a matching character string that appears in both the mobile URL and the non-mobile URL, defining an expression that specifies the matching character string, and defining a rule for mapping an input non-mobile URL to an output mobile URL, based on the expression.

BRIEF DESCRIPTION OF THE DRAWINGS

The accompanying drawings, which are incorporated in and constitute a part of this specification, illustrate embodiments of the invention and together with the description, serve to explain the principles of the invention. Wherever convenient, the same reference numbers have been used to refer to the same or similar components. In the figures:

FIG. 4 is an exemplary illustration of URL pairs processed in a manner consistent with embodiments of the invention;

FIGS. 5A and 5B are exemplary illustration of URL pairs processed in a manner consistent with embodiments of the invention.

DESCRIPTION OF EMBODIMENTS

In general, embodiments consistent with the present disclosure provide systems and methods that may be used to determine a mobile URL from a specified non-mobile URL or vice versa. In various embodiments, the determined URL may be tested to verify that it corresponds to the specified non-mobile URL (or mobile URL). In various embodiments, after one or more sets of mobile and corresponding non-mobile URLs are identified, the differences in the mobile and corresponding non-mobile URLs may be analyzed to create or define rules for converting from a non-mobile URL to a mobile URL, and vice versa.

Figure 1:
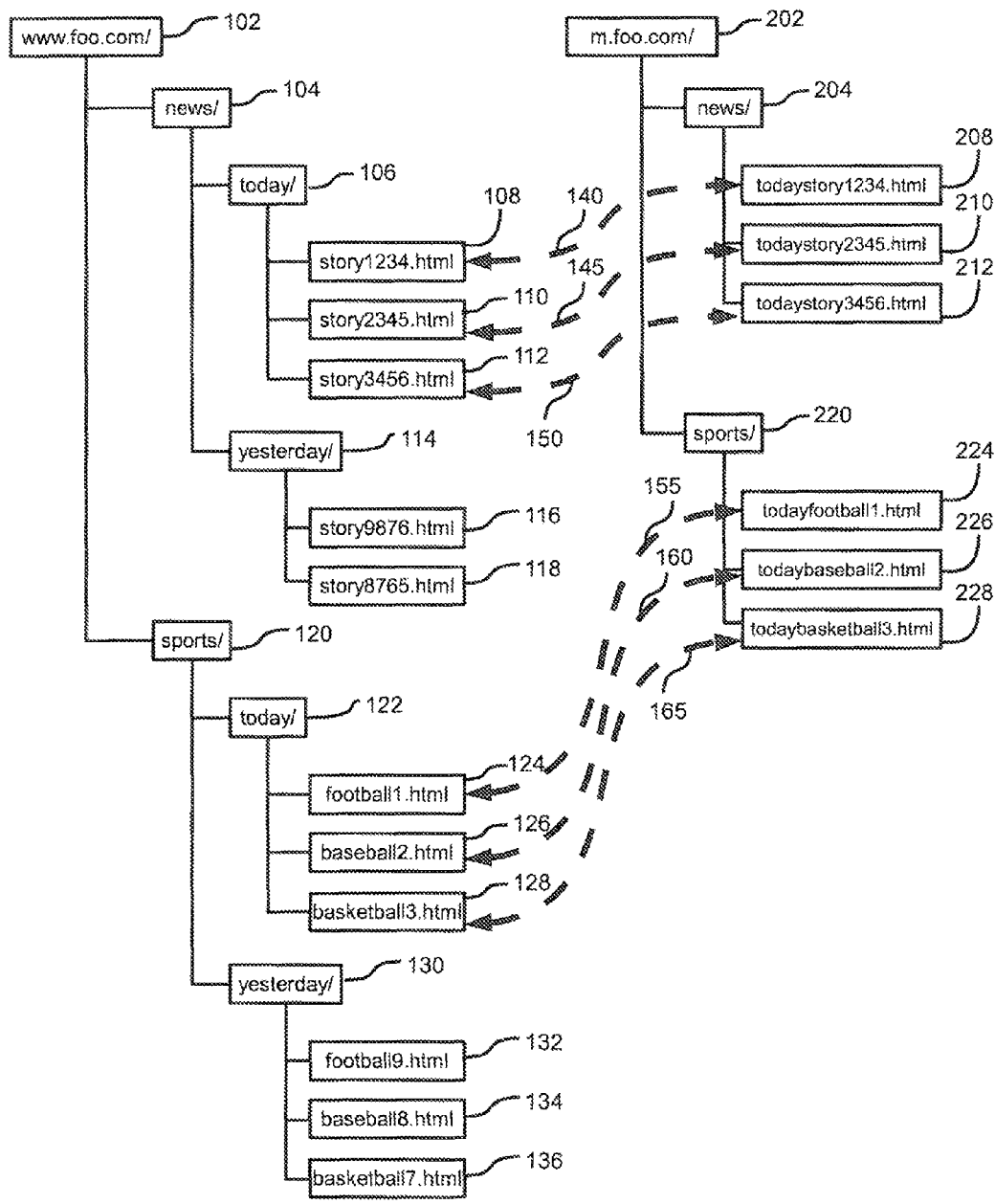
FIG. 1 illustrates an exemplary directory and URL name structure for non-mobile and corresponding mobile web pages, consistent with embodiments of the invention.

FIG. 1 illustrates an exemplary directory and URL name structure for non-mobile and corresponding mobile web pages, consistent with embodiments of the invention. In the embodiment shown, the left hand side of FIG. 1 illustrates an exemplary structure for the URLs of non-mobile web pages for a www.foo.com host name 102. As shown, there are two possible file paths under the www.foo.com host name 102—namely a file path via a news/directory 104 and a file path via a sports/directory 120. Using the news/file path as an example, the news/directory 104 includes two subdirectories under it: a today/subdirectory 106 and a yesterday/subdirectory 114. The today/subdirectory 106 has three files in it: a story1234.html file 108, a story2345.html file 110, and a story3456.html file 112. The yesterday/subdirectory 114 has two files in it: a story9876.html file 116 and a story8765.html file 118.

Thus, to give three examples, the URL for the non-mobile web page that presents story1234 is "http://www.foo.com/news/today/story1234.html," the URL for the non-mobile web page that presents story8765 is "http://www.foo.com/news/yesterday/story8765.html," and the URL for the non-mobile web page that presents basketball3 is "http://www.foo.com/sports/today/basketball3.html."

In the embodiment shown, the right hand side of FIG. 1 illustrates an exemplary structure for the URLs of mobile web pages for a m.foo.com host name 202. As shown, there are two possible file paths under the m.foo.com host name 202—namely a file path via a news/directory 204 and file path via a sports/directory 220. As shown, the mobile news/directory 204 includes three files in it: a todaystory1234.html file 208, a todaystory2345.html file 210, and a todaystory3456.html file 212. And, the mobile sports/directory 220 includes three files in it: a todayfootball1.html file 224, a todaybaseball2.html file 226, and a todaybasketball3.html file 228.

Thus, to give two examples from the mobile organizing structure, the URL for the mobile web page 208 that presents story1234 is "http://m.foo.com/news/todaystory1234.html" and the URL for the mobile web page 228 that presents basketball3.html is "http://m.foo.com/sports/todaybasketball3.html."

As shown, there are several differences in the directory structures, file paths, and file names between the non-mobile web pages on the left side of FIG. 1 and the mobile web pages on the right side of FIG. 1, resulting in differences between their URLs. Moreover, some of the non-mobile web pages have corresponding mobile web pages (and vice versa), (as represented by arrows 140-165), while others do not. For example, the non-mobile web page http://www.foo.com/news/today/story1234.html 108 corresponds to the mobile web page http://m.foo.com/news/todaystory1234.html 208 as represented by arrow 140, and the non-mobile web page http://www.foo.com/sports/today/baseball2.html 126 corresponds to the mobile web page http://m.foo.com/sports/todaybaseball2.html 226 as represented by arrow 160. In contrast, none of the non-mobile web pages 116, 118, 132, 134, and 136 have corresponding mobile web pages.

One of ordinary skill will recognize that structures, features, and organizational elements may be added to, removed from, or modified for the exemplary embodiment shown in FIG. 1, without departing from the principles of the invention. For example, the number of mobile web pages may be expanded to provide mobile pages corresponding to non-mobile web pages 116, 118, 132, 134, and 136.

Figure 2:
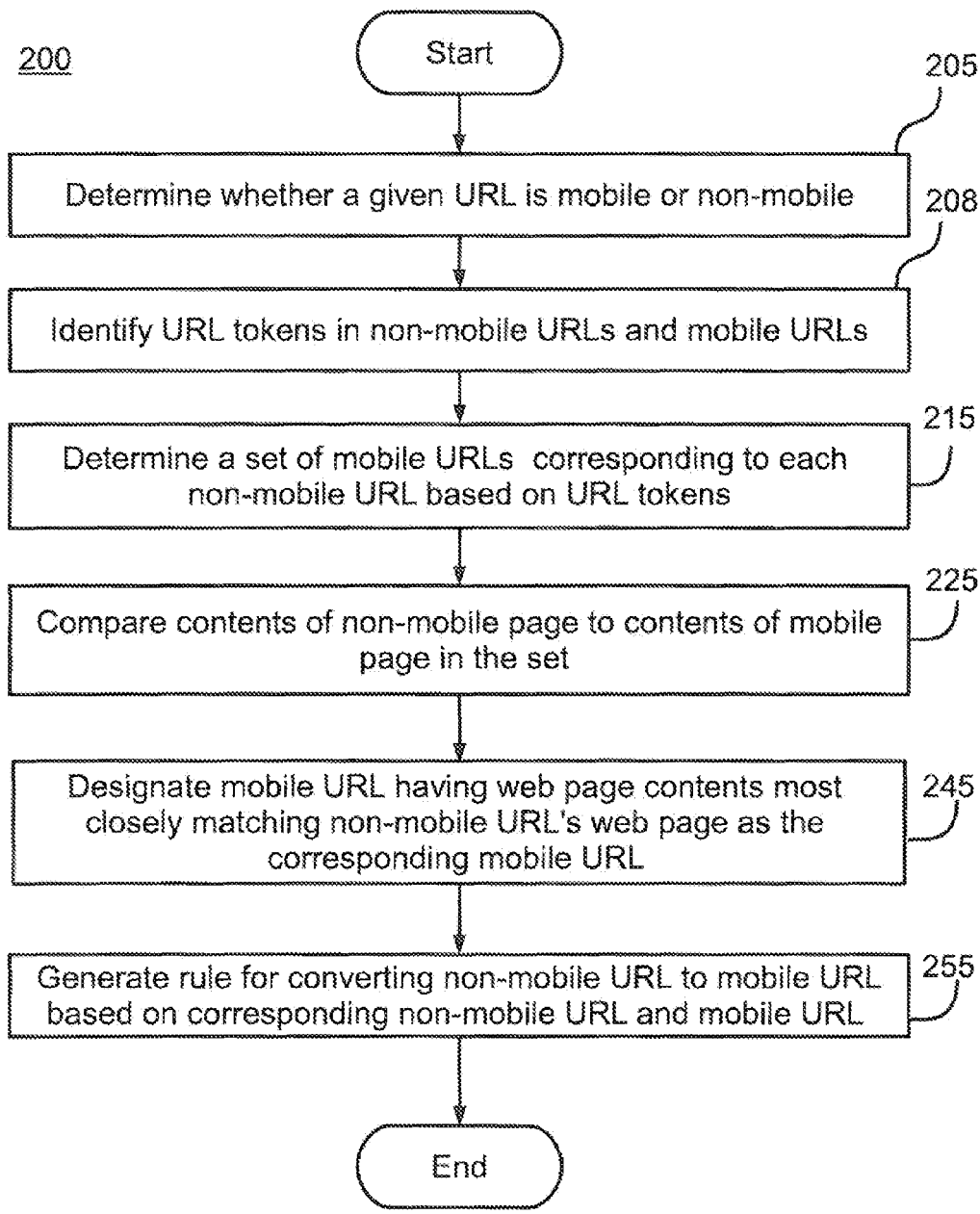
FIG. 2 is a flowchart of an exemplary process for finding corresponding non-mobile and mobile URLs, consistent with embodiments of the invention.

FIG. 2 is a flowchart of an exemplary process 200 for finding corresponding non-mobile and mobile URLs, consistent with embodiments of the invention. In various embodiments, some or all of process 200 may be implemented by a computing system or processor, such as the processor in a server computer or the processor in a portable electronic device, such as a smart phone or tablet computer.

As shown, process 200 begins with determining whether a given URL, (e.g., from a list of URLs compiled by a search service) is a mobile page URL or a non-mobile page URL (stage 205). In some embodiments, stage 205 may determine mobile page and non-mobile page based on the make-up of the URL. For example, a mobile domain name corresponding to a given non-mobile domain name (e.g., a desktop domain name input by a user) may be found by substituting "m" for "www" in the non-mobile domain name. For example, with reference to FIG. 1, substituting "m" for "www" in the non-mobile domain name "www.foo.com" yields "m.foo.com." Once domains are identified, pages in non-mobile domain name are determined as non-mobile pages while pages in mobile domain name are determined as mobile pages.

In various embodiments, URLs expressing a mobile page and a non-mobile page are not limited to host name replace (e.g., "www" to "m") as explained above. In some embodiments, stage 205 may use an algorithm that identifies mobile pages by the characteristic that they have an extra path "/m" that express that they are a mobile version. For example, mobile version pages of non mobile pages at 'www.bar.com' could use the path suffix '/m', i.e., www.bar.com/m. For instance, www.bar.com/article/12345 is a non-mobile page, while www.bar.com/m/article/12345 is the corresponding mobile page.

In some embodiments, stage 205 may use an algorithm that identifies mobile pages by the characteristic that they contain a URL token that represents mobile version pages with a parameter or query in the URL, for example, ?mobile=1. For instance, a non mobile page URL www.foo.com/article/12345 may correspond the mobile page URL www.foo.com/article/12345?mobile=1. In various embodiments, these URL fragments could be collected from the list of mobile page and non mobile page pairs collected manually or programmatically.

In various embodiments, stage 205 may use a classifier algorithm that does not rely on the URL to determine whether a page is mobile or non-mobile. As an example, the classifier may determine whether a page is mobile page by rendering the page in a mobile browser and then checking whether the rendered page is formatted for a mobile device, e.g., whether the rendered page fits the size of mobile browser; whether the letters on it are legible in the small mobile browser screen; etc. In another example, the classifier algorithm may look for certain html tags on the page being examined that have more meaning in, or are usually associated with, a mobile browser, (for example, 'viewport') and identify a URL as a mobile URL if the page contains one or more of those tags.

In stage 208, process 200 identifies URL tokens in non-mobile URLs and mobile URLs. In various embodiments of stage 208, URL tokens may be gathered from mobile pages and non-mobile pages. In some embodiments, stage 208 may find URL tokens from both the non-mobile URLs and the mobile URLs of the same domain by parsing the URLs into portions according to standard URL delimiters and/or according to heuristics associated with URLs. Standard URL delimiters include "/" "." "&" "=" "?" "#" and the like. For example, with reference to FIG. 1, the non-mobile URL "www.foo.com/sports/today/football1.html" may be parsed according to the "." and "/" delimiters to produce the set of URL tokens {www, foo, com, sports, today, football1, html}, and the mobile URL "m.foo.com/sports/todayfootball1.html" may be parsed according to standard delimiters to produce the set of URL tokens {m, foo, com, sports, todayfootball1, html}.

In various embodiments, stage 208 may employ an algorithm that removes or prevents common prefixes and suffixes, such as "www" "com" "html" and the like, from being included in the set of URL tokens, producing URL token sets such as {foo, sports, today, football1} and {foo, sports, todayfootball1}.

In various embodiments, stage 208 may identify "selective" URL tokens in non-mobile URLs for a given domain name and also identify "selective" URL tokens in mobile URLs for the corresponding mobile domain name. For example, after isolating a set of URL tokens for each URL, stage 208 may count the number of appearances of each token in the sets and disregard URL tokens that appear in too many sets (e.g., more than a threshold percentage of sets, such as 50%) because they are not "selective," e.g., not useful for judging whether a URL is related to a specific web page, or not useful for determining a possible non-mobile URL and mobile URL pair. For example, with reference to FIG. 1, the URL tokens "foo" "news" and "sports" appear in the URL token set of web page files 108-112, 116, 118, 124-128, 132-136, 208-212, and 224-228, so these tokens may be disregarded as not being selective or discriminating portions of the URL. In other words, some embodiments identify a selective or discriminating URL token as a URL token that appears in relatively few URLs of a specified domain. Thus, a URL token may be selective in one domain, but not be selective in another domain.

In some other embodiments that do not rely on URL delimiter parsing, stage 208 may find selective URL tokens from both the non-mobile URLs and the mobile URLs of the same domain by sorting the URLs of a domain and then identifying the discriminating or selective portion(s) or token(s) of the URLs based on their being different from the corresponding portion(s) or token(s) of the other URLs in the domain.

For example, with respect to FIG. 1, stage 208 may sort the non-mobile URLs as follows:
www.foo.com/news/today/story1234.html
www.foo.com/news/today/story2345.html
www.foo.com/news/today/story3456.html
www.foo.com/news/yesterday/story9876.html
www.foo.com/news/yesterday/story8765.html
www.foo.com/sports/today/football1.html
www.foo.com/sports/today/baseball2.html
www.foo.com/sports/today/basketball3.html
www.foo.com/sports/yesterday/football9.html
www.foo.com/sports/yesterday/baseball8.html
www.foo.com/sports/yesterday/basketball7.html By comparing adjacent URLs, stage 208 may isolate the changing part(s) or portion(s) of the non-mobile URLs, which may be considered the discriminating or selective URL token(s). For example, by comparing www.foo.com/news/today/story1234.html to www.foo.com/news/today/story2345.html, stage 208 may determine that "1234" and "2345" are selective URL tokens. Continuing on, by comparing www.foo.com/news/today/story2345.html to www.foo.com/news/today/story3456.html, stage 208 may determine that "2345" and "3456" are selective URL tokens. Similarly, by comparing www.foo.com/news/today/story3456.html to www.foo.com/news/yesterday/story9876.html, stage 208 may determine that "today" "yesterday" "3456" and "9876" are selective URL tokens, etc.

As a further example, stage 208 may sort the mobile URLs of FIG. 1 as follows:
m.foo.com/news/todaystory1234.html
m.foo.com/news/todaystory2345.html
m.foo.com/news/todaystory3456.html
m.foo.com/sports/todayfootball1.html
m.foo.com/sports/todaybaseball12.html
m.foo.com/sports/todaybasketball3.html As noted above, by comparing adjacent URLs, stage 208 may isolate the changing part(s) or portion(s) of the mobile URLs, which may be considered the discriminating or selective URL token(s). For example, by comparing m.foo.com/news/todaystory1234.html to m.foo.com/news/todaystory2345.html, stage 208 may determine that "1234" and "2345" are selective URL tokens, and by comparing m.foo.com/news/todaystory3456.html to m.foo.com/sports/todayfootball1.html, stage 208 may determine that "news" "sports" "story3456" and "football1" may be considered discriminating or selective URL tokens, etc.

In some embodiments, stage 208 may implement a minimum length requirement, or the like, for selective URL tokens, (e.g., a requirement for at least eight characters for tokens derived from filenames), to avoid choosing tokens that are too short to be useful in differentiating large numbers of URLS. For an example with respect to such an embodiment, comparing m.foo.com/news/todaystory1234.html to m.foo.com/news/todaystory2345.html, may determine that "story1234" and "story2345" are selective URL tokens.

Some embodiments of stage 208 may employ heuristic techniques to find selective URL tokens. For example, heuristic techniques may be employed to separate a string that appears between URL delimiters into two separate URL tokens. For instance, stage 208 may initially separate the non-mobile URL "http://www.foo.com/news/article/033112-internet-service-on-mobile.html" into the URL token set {news, article, 033112-internet-service-on-mobile, html}. By looking for numeric strings at the beginning and/or end of each URL token, based on a heuristic recognition that dates are often prepended or appended to directory names and file names, stage 208 may identify the string "033112" as a date, and separate and identify it as a separate URL token, yielding the URL token set {news, article, 033112, internet-service-on-mobile, html}. Various embodiments may employ this and similar heuristic techniques to deal with non-mobile pages and mobile pages that do not share exactly the same URL structure.

For instance, in this example, for the non-mobile URL "http://www.foo.com/news/article/033112-internet-service-on-mobile.html" the corresponding mobile URL may be "http://m.foo.com/033112/internet-service-on-mobile.html" which yields the URL token set {033112, internet-service-on-mobile, html}. Splitting the non-mobile URL token "033112-internet-service-on-mobile" into two tokens "033112" and "internet-service-on-mobile" improves the chances that succeeding stages of process 200 will determine that the non-mobile URL and mobile URL are perhaps a corresponding pair because they share a URL token, as explained further below. Here, without the splitting, the non-mobile URL token set {news, article, 033112-internet-service-on-mobile, html} and the mobile URL token set {033112, internet-service-on-mobile, html} have no matching URL tokens, while with splitting, the non-mobile URL token set {news, article, 033112, internet-service-on-mobile, html} and the mobile URL token set {033112, internet-service-on-mobile, html} have the token "033112" in common.

At stage 215, process 200 determines a set of mobile URLs that correspond closely to each non-mobile URL based on the URL tokens identified in stage 208. In various embodiments, stage 215 identifies portions of a URL (i.e., URL tokens) that appear in both a non-mobile URL and mobile URL(s) for a domain, because URL tokens that are common to both a non-mobile URL and a mobile URL may indicate that the non-mobile URL and the mobile URL are paired—i.e., that the mobile URL's webpage corresponds, or is at least a candidate for corresponding, to the non-mobile URL's webpage, and vice versa. In various embodiments, stage 215 may produce a set of two or more candidate mobile URLs that correspond to a single non-mobile URL.

In some embodiments, stage 215 may appraise the quantity of URL tokens that appear in both a given non-mobile URL and candidate mobile URLs to determine a set of zero or more mobile URLs that correspond to the given non-mobile URL. For example, if there are a sufficient number of number of URL tokens in common between a non-mobile URL and a mobile URL, then stage 215 may add the mobile URL to the set of mobile URLs corresponding to the non-mobile URL. In various embodiments, a sufficient number may be specified by a percentage, such as 70% of URL tokens in common, or may be specified by some other technique.

In some embodiments, stage 215 may appraise only the quantity of selective URL tokens that appear in both a given non-mobile URL and candidate mobile URLs, or give greater weight for selective URL tokens that appear in both a given non-mobile URL and candidate mobile URLs, in determining a set of zero or more mobile URLs that correspond to the given non-mobile URL. For example, if there are a sufficient number of selective URL tokens in common between a non-mobile URL and a mobile URL, then stage 215 may add the mobile URL to the set of mobile URLs corresponding to the non-mobile URL. In such embodiments, a sufficient number may be specified by a threshold number, such as one or more selective URL token in common, or may be specified by a combination of criteria, such as 50% of URL tokens in common and at least one selective URL token in common.

For an example using only selective tokens, consider from FIG. 1 the non-mobile URL www.foo.com/news/today/story1234.html, which process 200 may assess as having selective URL tokens "today," "story," and "1234." Consider further from FIG. 1 the mobile URL m.foo.com/news/todaystory1234.html, which process 200 may assess as having selective URL tokens "today," "story," and "1234," the mobile URL m.foo.com/news/todaystory2345.html, which process 200 may assess as having selective URL tokens "today," "story," and "2345," and the mobile URL m.foo.com/news/todaystory3456.html, which process 200 may assess as having selective URL tokens "today," "story," and "3456." In this example, if the criteria for determining a set of mobile URLs corresponding to the non-mobile URL is to have at least two selective URL tokens in common, then m.foo.com/news/todaystory1234.html meets the criteria (selective URL tokens "today," "story," and "1234" in common with the non-mobile URL); m.foo.com/news/todaystory2345.html meets the criteria (selective URL tokens "today" and "story" in common); and m.foo.com/news/todaystory3456.html meets the criteria (selective URL tokens "today" and "story" in common). Thus, in this example, the set of mobile URLs determined by stage 215 contains three members.

As illustrated by this example, stage 215 may produce a set of mobile URLs that has more than one member—i.e., more than one candidate mobile URL that may correspond to the subject non-mobile URL. Process 200 proceeds to select from among the candidate mobile URLs a mobile URL web page that most closely corresponds to the non-mobile URL's web page. Specifically, at stage 225, process 200 compares the contents of the non-mobile web page specified by the non-mobile URL to the contents of a mobile web page specified by one of the mobile URLs in the set of one or more mobile URLs determined by stage 215.

In some embodiments, stage 225 may be implemented using a natural language processing "shingling" technique, wherein contiguous subsequences of content tokens in a web page document (e.g., words) are used to gauge the similarity of two web page documents. For example, in some embodiments, stage 225 may remove boilerplate or non-substantive content (e.g., ads, menus, headers, footers, navigation bars, and the like) from both the non-mobile web page and the candidate mobile web page; extract shingles (e.g., contiguous 4-word sequences) from both the boiler-plate-removed non-mobile web page and the boiler-plate-removed candidate mobile web page; and then calculate the number of shingles in common between the boiler-plate-removed non-mobile web page and the boiler-plate-removed candidate mobile web page.

In other embodiments, stage 225 may be implemented using statistical probability techniques. For example, in some embodiments, stage 225 may extract content tokens (e.g., a string, a word, a group of words, or the like) from both the non-mobile web page and the candidate mobile web page and compare the content tokens from the non-mobile web page and the candidate mobile web page to identify the common tokens that appear in both the non-mobile web page and the candidate mobile web page.

Stage 225 may then compute the probability of a common token appearing at random in any web page. For instance, a search engine may keep track of the occurrence of each word in a specified universe of documents (e.g., the universe of all crawled web pages, the universe of all web pages within a domain, etc.). For example, the words "a" and "the" occur extremely often in a universe of documents, while the word "incompressible" may occur infrequently in the same universe of documents. By dividing the number of occurrences of a content token (e.g., a word) by the total number of documents in the universe, stage 225 may compute a probability of the token's random appearance in any one document.

Using the probability of a common token's random appearance in any one document, stage 225 may then compute the probability of the common token's random appearance in two documents (e.g., of the common token's random appearance in the non-mobile web page and in the candidate mobile web page). By considering such probabilities for text tokens in both mobile and non-mobile pages, process 200 may compute a probabilistic measure expressing how likely it is that the two pages randomly contain the same text.

At stage 245, process 200 designates the mobile URL that has web page contents most closely matching the non-mobile URL's web page contents as the corresponding mobile URL. In various embodiments, if more than one mobile URLs are candidates for the mobile URL that potentially corresponds to the non-mobile URL, then stage 245 may rank the degree of matching between the non-mobile URL and the various candidate mobile URLS according to a metric(s), such as the length of the mobile URL (e.g., a shorter mobile URL is preferred over a longer mobile URL), the page ranking of the mobile URL (e.g., a mobile URL with a higher Google® page ranking is preferred over a lower ranked mobile URL), the amount of web page content in common, etc. For embodiments employing web page content metrics, stage 245 may compare the contents of the web page for each candidate mobile URL and the contents of the web page for the non-mobile URL, and then choose the mobile URL webpage having the highest degree of matching content as the mobile URL that correctly corresponds with the non-mobile URL.

For example, referring again to the shingling example from stage 225, some embodiments of stage 245 may designate the mobile URL whose web page has the most shingles in common with the non-mobile URL's web page to be the corresponding mobile URL. In some embodiments, the shingle similarity may also be required to exceed a minimum threshold (e.g., 51% shingle similarity) for stage 245 to designate the mobile URL as the designated pair to the non-mobile URL.

For example, referring again to the statistical probability example from stage 225, some embodiments of stage 245 may compare the computed probability of a content token appearing randomly in two web pages to a predefined threshold, and if this probability is below the predefined threshold, (e.g., below 1/10,000,000,000, below 1/100,000,000, etc.), then stage 245 may designate the mobile URL whose web page has the low-probability content token in common with the non-mobile URL's web page to be the corresponding mobile URL.

At stage 255, process 200 generates a rule(s) for converting or translating a non-mobile URL to a mobile URL, where the rules are based on the pair(s) of corresponding non-mobile and mobile URLs designated in stage 245. In some embodiments, stages 205-245 may be executed several times to find several pairs of corresponding non-mobile and mobile URLs before executing stage 255, such that stage 255 has multiple exemplary URL pairs from which to recognize translation patterns and generate rules.

In various embodiments, the rules may be formulated to mimic consistent or characteristic translation patterns observed between a non-mobile URL and its corresponding mobile URL. For example, with regard to FIG. 1, "www" in the domain name of the non-mobile URL is consistently replaced by "m" in the domain name of the corresponding mobile URL, and the bottom-level directory and filename of a non-mobile URL are consistently concatenated without a slash ("/") to form the filename of the corresponding mobile URL. Thus, in this example, the rules for converting a non-mobile URL to a mobile URL may include: 1) replace "www" in the non-mobile URL with "m" to form the mobile URL's domain name; 2) concatenate the non-mobile URL's lowest level directory name with the non-mobile URL's filename to form the mobile URL's file name.

Further exemplary rules generation examples are explained below with respect to FIG. 3.

One of ordinary skill will recognize that stages may be added to, deleted from, modified, or reordered in process 200 without departing from the scope of the invention. For example, stage 255 may be deleted. For another example, stage 255 may be replaced by a stage that outputs the non-mobile URL/mobile URL pair calculated by stages 205-245, for example to a display screen, to a memory, to a storage device, as an input to another process, and the like. For yet another example, stages 205-245 may be performed several times for several different non-mobile URLs from a given domain before stage 255 is executed. In addition, process 200 may be used to find a non-mobile URL(s) corresponding to a mobile URL, by starting with the mobile URL instead of the non-mobile URL and applying the described operations and techniques.

Figure 3:
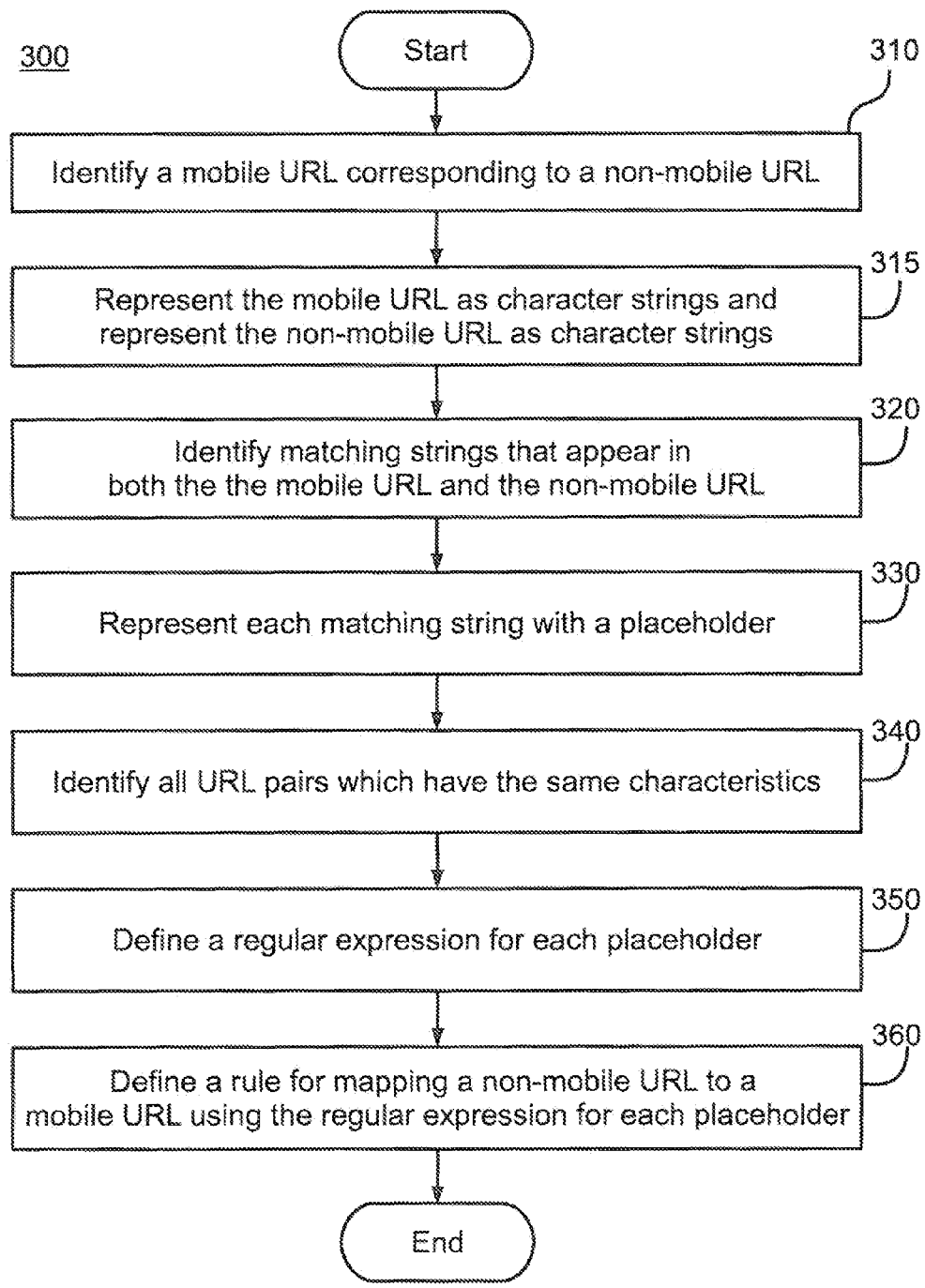
FIG. 3 is a flowchart of an exemplary process for defining rules for mapping URLs, consistent with embodiments of the invention.

FIG. 3 is a flowchart of an exemplary process 300 for finding corresponding non-mobile and mobile URLs, consistent with embodiments of the invention. In various embodiments, some or all of process 300 may be implemented by a computing system or processor, such as the processor in a server computer or the processor in a portable electronic device, such as a smart phone or tablet computer.

As shown, process 300 begins with identifying a mobile URL that corresponds to a non-mobile URL, or in other words, identifying a non-mobile/mobile URL pair (stage 310). For example, with respect to FIG. 1, stage 310 may identify the mobile URL "m.foo.com/sports/todayfootball1.html" as corresponding (represented by arrow 155) to the non-mobile URL "www.foo.com/sports/today/football1.html." In some embodiments, stage 310 may be implemented using stages 205-245 of process 200 as shown in FIG. 2.

At stage 315, process 300 represents the mobile URL as a set of character strings or URL tokens and represents the non-mobile URL as a set of character strings or URL tokens. As noted previously, a URL token may be a string of characters that form a portion of a URL. In some embodiments, the string used for a URL token must meet specified criteria, such as a minimum length criteria (e.g., at least 4 characters), and/or a delimiter criteria (e.g., string contained between URL delimiters), and the like. Continuing the example of the previous paragraph related to FIG. 1, stage 315 may represent the mobile URL "m.foo.com/sports/todayfootball1.html"
as the set of character strings (or URL tokens)
{m., foo.com/, sports/, today, football1}.
Similarly, stage 315 may represent the non-mobile URL
www.foo.com/sports/today/football1.html
as the set of character strings (or URL tokens)
{www., foo.com/, sports/, today/, football1}.

Similarly, referring now to FIG. 4, the URL pair www.aaaa.com/news/bbb123 and m.aaaa.com/news/bbb123 (shown in cell 421 of column 402) may be represented by the sets of character strings {www., aaaa.com, news, bbb123} and {m. aaaa.com, news, bbb123}, respectively, as shown in cell 422 of column 404; the URL pair www.aaaa.com/news/bbb123 and m.aaaa.com/mobile/bbb123 (shown in cell 426 of column 402) may be represented by the sets of character strings {www., aaaa.com, news, bbb123} and {m. aaaa.com, mobile, bbb123}, respectively, as shown in cell 427 of column 404; and the URL pair www.aaaa.com/news/bbb234 and m.aaaa.com/mobile/bbb456 (shown in cell 431 of column 402) may be represented by the sets of character strings {www., aaaa.com, news, bbb234} and {m. aaaa.com, mobile, bbb456}, respectively, as shown in cell 432 of column 404. Additional examples are shown in FIG. 5A, cells 445 and 446; 450 and 451; and 455 and 456, as well as in FIG. 5B, cells 470 and 471, 475 and 476, and 480 and 481.

Referring again to FIG. 3, at stage 320, process 300 identifies one or more matching or in-common character strings (or URL tokens) that appear in both the mobile URL and the corresponding non-mobile URL. Continuing the example related to FIG. 1, from these two sets of character strings:

| {m,   | foo.com/, | sports/, | today,  | football1} |
|-------|-----------|----------|---------|------------|
| {www, | foo.com/, | sports/, | today/, | football1} | stage 320 may identify the strings or URL tokens "foo.com/" "sports/" and "football1" as matching in both sets—i.e., as appearing in both the mobile URL and the non-mobile URL.

Similarly, referring to FIG. 4, cell 423 of column 406 shows the sets of character strings from cell 422 with the matching character strings from each set underlined and aligned vertically. Similarly, cells 428 and 433 of column 406 show as underlined the matching character strings from the sets of character strings shown in cells 427 and 432, respectively.

In particular, as shown in cell 423, the character strings "aaaa.com" "news" and "bbb123" are matching strings that appear in both the non-mobile URL and the mobile URL of cell 421. As shown in cell 428, the character strings "aaaa.com" and "bbb123" are matching strings that appear in both the non-mobile URL and the mobile URL of cell 426. And, as shown in cell 433, the character strings "aaaa.com" and "bbb" are matching strings that appear in both the non-mobile URL and the mobile URL of cell 431. In various embodiments, as shown in cell 433, the matching strings may be substrings of larger strings in which some, but not all of the characters are the same sequentially, such as the strings "bbb234" and "bbb456", wherein the first three characters of each string ("bbb") are the same, but the remaining characters are different.

In some embodiments, stage 340 may limit its analysis to strings (e.g., URL tokens) that appear in the same relative position in the two URLs, such as the first token in the URL or the last token in the URL. In some embodiments, stage 340 may use the set representations of two or more URLs to identify strings or tokens that are in the same relative position. For example, the two sets

| {m,   | 1, | 2, | today,  | 3} |
| {www, | 1, | 2, | today/, | 3} | respectively have the strings "m" and "www" in the first position and the strings "today" and "today/" in the fourth position. Thus, for such embodiments, the strings "m" and "www" may be analyzed to determine whether they are partially matching strings because they are both in the first position of their respective strings, and the strings "today" and "today/" may be analyzed to determine whether they are partially matching strings because they are both in the fourth position of their respective strings. In contrast, the strings "www" and "today" may not be analyzed to determine whether they are partially matching strings because "www" is in the first position of its string, while "today" is in the fourth position of its string.

Continuing this example, with respect to the strings "m" and "www," stage 340 would not identify them as partially matching strings because they have no characters in common. With respect to the strings "today" and "today/," on the other hand, stage 340 may identify them as partially matching strings because they have five characters (in this case the letters "today") in common and in the same order.

For further examples of identifying matching or in-common character strings that appear in both URLs of a URL pair, consider FIG. 5A, where the cells in column 440 show with underlining the matching strings for URL pairs shown in column 436; and consider FIG. 5B, where the cells in column 464 show with underlining the matching strings for URL pairs shown in column 460.

Referring again to FIG. 3, at stage 330, process 300 represents each matching string with a placeholder. For example, for the sets of strings

| {m,   | foo.com/, | sports/, | today,  | football1} |
| {www, | foo.com/, | sports/, | today/, | football1} | stage 330 may assign the placeholder "const_1" to represent the matching string "foo.com/," assign the placeholder "const_2" to represent the matching string "sports/" and assign the placeholder "const_3" to represent the matching string "football1." Thus, substituting in these abstracting placeholders, the two sets of character strings shown above the previous paragraph may be represented as:

| {m,   | const_1, | const_2, | today,  | const_3} |
| {www, | const_1, | const_2, | today/, | const_3} | where const_1="foo.com/," const_2="sports/" and const_3="football1." As explained further below, these abstracting placeholders may be used in rules for converting a non-mobile URL to a mobile URL, and vice versa, and for finding a mobile URL that corresponds to a given non-mobile URL, and vice versa. For example, a rule implementation may require that if a string matching an abstracting placeholder appears in a non-mobile URL, then that same string should be used unchanged when constructing a corresponding mobile URL. For instance, if the string "foo.com," which corresponds to the assigned placeholder const_1 in this example, appears in a non-mobile URL of this domain, then the string "foo.com" should be placed in the same relative position in a predicted corresponding mobile URL that may be constructed using this rule.

For further examples of representing each matching string with a placeholder, with reference to FIG. 5A, cell 448 of column 442 shows the non-mobile URL www.aaaa.com/news/bbb123 represented as www.const_1/const_2/const_3 and the mobile URL m.aaaa.com/news/bbb123 represented as m.const_1/const_2/const_3, both with the placeholders const_1, const_2, and const_3 replacing the matching strings "aaaa.com" "news" and "bbb123" as indicated in cells 447 and 448. Similarly, cell 453 of column 442 shows the placeholder representations of the URLs from cell 450; and cell 458 of column 442 shows the placeholder representations for the URL pair from cell 455 of column 436. Likewise, referring to FIG. 5B, cell 473 of column 466 shows the non-mobile URL www.aaaa.com/news/bbb123 represented as www.const1/news/const2 and the mobile URL m.aaaa.com/mobile/bbb123 represented as m.const_1/mobile/const_2, both with the placeholders const_1, and const_2 replacing the matching strings "aaaa.com" and "bbb123" as indicated in cells 472 and 473. Similarly, cell 478 of column 466 shows the placeholder representations of the URLs from cell 475; and cell 483 of column 466 shows the placeholder representations for the URL pair from cell 480 of column 460.

In sum, stages 315-330 of FIG. 3 may be implemented in various fashions to extract matching character strings from a pair of URLs, (i.e., a non-mobile URL and a corresponding mobile URL), and assign a unique placeholder expression to each matching string. In various embodiments, stages 310-330 may be repeated for several known non-mobile/mobile URL pairs, for in general, the larger the sample size, the more accurate and comprehensive the rules generated from the sample will be.

At stage 340, process 300 identifies the pairs of URLs that have the same or similar mapping or transformation characteristics. In various embodiments, process 300 may identify all the URL pairs that have the same mapping characteristics, and group them together for further processing. For example, the exemplary table of FIG. 5A contains three pairs of URLs, as shown in column 436, that have been identified and grouped together in the table because they have the same mapping characteristics. In particular, as shown in FIG. 5A, all of the URL pairs listed in column 436 have the same mapping characteristics when the URLs are represented with placeholders—namely, the non-mobile URL representations "www.const_1/const_2/const_3" map to the mobile URL representations "m.const_1/const_2/const_3," as shown in column 442. Similarly, as shown in the exemplary table illustrated in FIG. 5B, all of the URL pairs listed in column 460 have been identified as having the same mapping characteristics when the URLs are represented with placeholders—namely, "www.const_1/news/const_2" characteristically maps to "m.const_1/mobile/const_2" for these URL PAIRS, as shown in column 466.

As shown in FIG. 3, at stage 350, process 300 defines or creates or determines a regular expression for each placeholder for each matching string. In various embodiments, each regular expression specifies or defines a set of characters. As is known in the computing arts, a regular expression is an expression in a standard syntax for specifying and recognizing strings of text, such as particular characters, words, or patterns of characters. In general, a regular expression, also called a pattern, is a concise way to specify the members of a set of strings using standardized operators. For example, the three strings "bbb1234" "bbb2345" and "bbbdefg" may be represented by the regular expression: "bbb.{4}" which specifies or matches any string that begins with the three characters "bbb" followed by any four characters. Thus, in stage 350, a regular expression may be used to specify the string(s) that each placeholder may possibly represent.

Referring to FIG. 5A for an example, stage 350 may define the regular expression "aaaa\.com" (the backslash "\" in the regular expression syntax indicates that the "." special character is treated as a literal character) to specify the placeholder const_1 because const_1 always represents the string "aaaa.com" in the URLs shown in FIG. 5A. Similarly, stage 350 may create or determine the regular expression "news" to specify the placeholder const_2 because const_2 always represents the string "news" in the URLs shown in FIG. 5A. Finally, stage 350 may define or generate the regular expression "bbb.{3}" (which means "bbb" followed by any 3 characters) to specify the strings that match, or are represented by, const_3, because const_3 represents "bbb123" in cell 448, represents "bbb123" in cell 453, and represents "bbb234" in cell 458.

Referring to FIG. 5B for another example, stage 350 may define the regular expression "aaaa\.com" to specify the placeholder const_1 because const_1 always represents the string "aaaa.com" in the URLs shown in FIG. 5B. And, stage 350 may produce the regular expression ".*" to specify the strings that match, or are represented by, const_2, because const_2 represents "bbb123" in cell 473, represents "bcd234" in cell 478, and represents "cdefg" in cell 483. In regular expression syntax, ".*" means match any character zero or more times.

At stage 360, process 300 defines or creates a rule(s) for mapping a non-mobile URL to a mobile URL (or vice-versa) using the regular expression(s) defined in stage 350. For example, referring again to FIG. 5A, stage 360 may define a rule such as:

If a non-mobile URL matches www.const_1/const_2/const_3,
   where const_1=(e.g., matches) the regular expression "aaaa\.com"
      const_2=the regular expression "news" and
      const_3=the regular expression "bbb.{3}"
then the corresponding mobile URL is m.const_1/const_2/const_3. In various embodiments, rules, such as this example, which include a match to any characters (e.g., ".{3}" matches any three characters) may further require that the same three characters of the non-mobile URL matching ".{3}" be used for the mobile URL. Thus, if the non-mobile URL match for bbb.{3} is "bbb1x8" then the corresponding mobile URL would also use "bbb1x8" in the same position in the URL.

For another example, referring now to FIG. 5B, the defined rule may be:

If a non-mobile URL matches www.const_1/news/const_2,
   where const_1=the regular expression "aaaa\.com" and
      const_2=the regular expression ".*"
then the corresponding mobile URL is m.const_1/mobile/const_2.

In various embodiments, the rule defined in stage 360 represents the mapping function or conversion function that applies to a group of URL pairs, such as the group of three URL pairs shown in FIG. 5A, column 436, or the group of three URL pairs shown in FIG. 5B, column 460. As shown in the examples of rules above, if any given non-mobile URL matches the regular expression(s) that represents the non-mobile URLs of a group of URL pairs, (as determined in stage 340 and 350), then the mapping function that converts that group's non-mobile URLs to mobile URLs (as specified by the rule) can be used to specify a predicted corresponding mobile URL.

One of ordinary skill will recognize that stages may be added to, deleted from, modified, or reordered in process 300 without departing from the scope of the invention. For example, stage 310 may be modified to identify several pairs of non-mobile and mobile URLs, and the remaining stages may be executed using the several pairs. Or similarly, stages 310-330 may be repeated for each non-mobile URL/mobile URL pair in a plurality of non-mobile URL/mobile URL pairs, and then stages 340-360 may be implemented to process each group of pairs sharing the same characteristics, so as to generate one or more non-mobile URL to mobile URL conversion rules. As another example, as noted previously, process 300 may be modified to generate a rule(s) for mapping or converting a mobile URL to a non-mobile URL, instead of going from a non-mobile URL to a mobile URL, as used in the examples above.

As another example of modifying process 330, stages 310-340 (which may be characterized as candidate generation stages) may be replaced by a stage that identifies URL pairs that have the same characteristics by extracting meaningful text from the content of the web pages specified by each URL pair, and comparing the extracted text to determine which mobile and non-mobile pages match. This variant embodiment may require many more computing and memory resources than the embodiment shown in FIG. 3.

In various embodiments, process 300 generates rule(s) that translate or convert a non-mobile URL into a mobile version of the same URL based on analysis of the relationships between observed non-mobile URL/mobile page URL pairs. The rules, therefore, may produce a predicted or anticipated mobile URL that corresponds to an input non-mobile URL.

A URL generated or determined with a rule may be considered "predicted" or "anticipated" because not all non-mobile pages (URLs) have a corresponding mobile page, because the rule may be over-generalized, resulting in an incorrect non-mobile to mobile URL conversion, or for other reasons. For example, some current event websites may delete the mobile versions of web pages containing news that is more than one month old, while keeping non-mobile versions of the same web pages considerably longer. To address this characteristic, some embodiments may verify that the predicted mobile URL specifies a web page that reasonably correlates to the non-mobile URL's web page by comparing the content of the two web pages, for example, as described with respect to process 200 of FIG. 2.

In some embodiments, the rule defined by process 300 may be used to search for or identify a corresponding mobile URL for a given non-mobile URL, and the like. For example, some search services do not perform as well finding mobile pages and mobile page content, compared to finding non-mobile pages and content. As most search engines have been optimized for searching the desktop (i.e., non-mobile) versions of documents, they often fail to crawl or index mobile versions of desktop pages, and they do not index mobile pages, or do not index them as well and as thoroughly as they do non-mobile pages. From the user's point of view, this makes it hard to find the mobile pages that correspond to desktop pages. In various embodiments, rule(s) defined by process 300 or the like may be used by a search service to efficiently find and index the mobile pages (URLs) that correspond to already indexed non-mobile pages.

As mentioned, in some embodiments, the rule(s) defined by process 300 may be used by a search service to identify the mobile URL that corresponds to a given non-mobile URL, and vice versa. In some embodiments, the search service may provide the web pages for the corresponding mobile and non-mobile URLs to a user whose search found one or both the web pages. In such embodiments, the search service may present the corresponding mobile and non-mobile search result pages by: displaying a link near the desktop (non-mobile) version results with a label such as "See this in mobile version," displaying a link near the mobile version results with a label such as "See this in non-mobile version," replacing non-mobile version results with mobile version results, replacing mobile version results with non-mobile version results, boosting (e.g., displaying nearer the top of an ordered list) mobile version results when displaying non-mobile version results, discovering and displaying mobile URLs using rules and non-mobile URLs from the search service's index.

In various embodiments, the rule(s) defined or created by process 300 may be employed by an application, such as an application designed to run on a mobile device such as a smart phone or a tablet computer, to automatically access a mobile URL corresponding to an input non-mobile URL, such as a non-mobile URL input by a user, a web page link, or another application. For example, such an application may convert non-mobile URLs to mobile version URLs before the mobile device transmits a page request to a server. For instance, if a news application tries to open a non-mobile version webpage, the application embodiment intercepts the non-mobile URL and converts it to the corresponding mobile URL before transmission from the mobile device to the network, so that mobile device receives the mobile-optimized page for display to the user.

Figure 6:
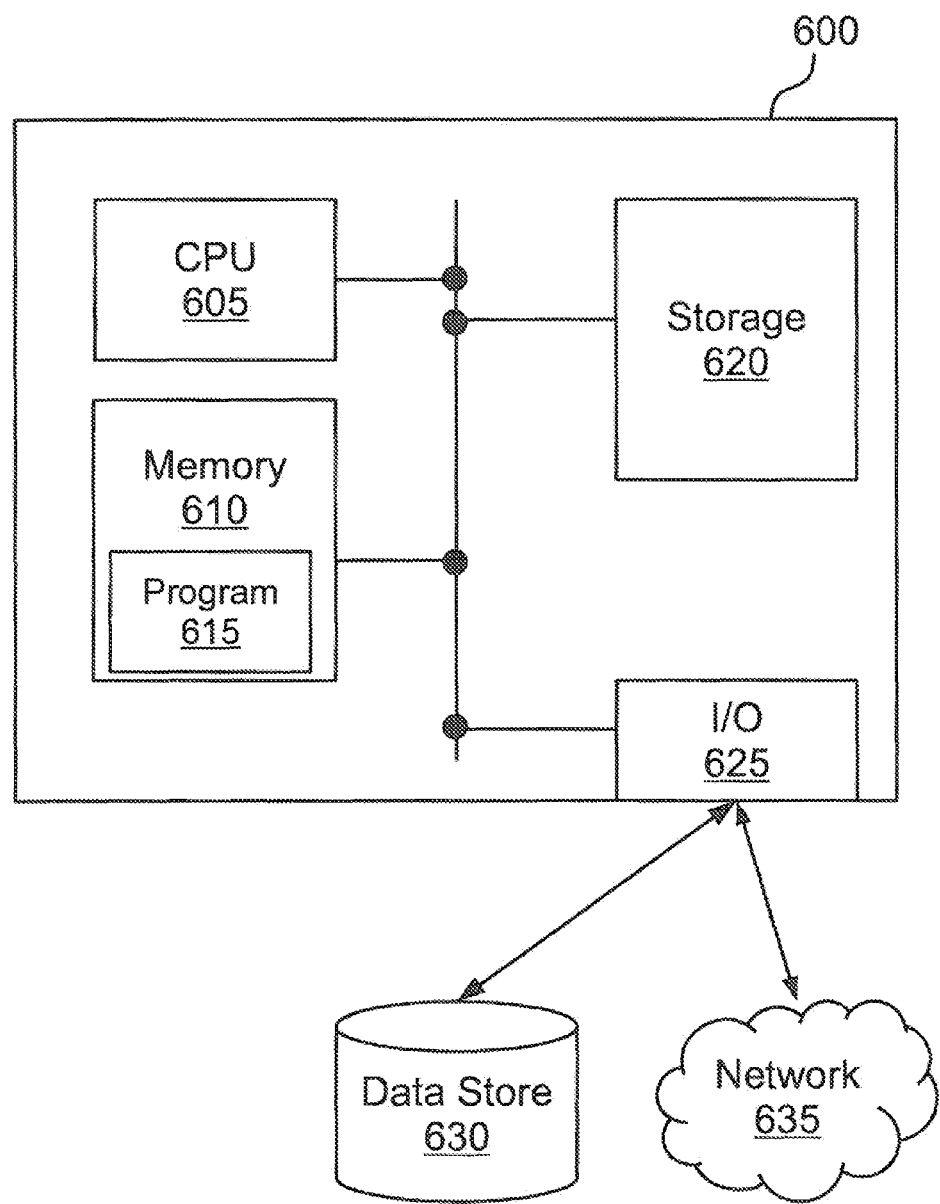
FIG. 6 is a block diagram of an exemplary computing or data processing system that may be used to implement embodiments consistent with the invention.

FIG. 6 is a block diagram of an exemplary computing system or data processing system 600 that may be used to implement embodiments consistent with the invention. Other components and/or arrangements may also be used. In some embodiments, computing system 600 may be part of a portable electronic device, such as a smart phone, a tablet computer, a gaming device, a music playing device, etc. In other embodiments, computing system 600 may be included in a server that provides web search services.

Computing system 600 includes a number of components, such as a central processing unit (CPU) 605, a memory 610, an input/output (I/O) device(s) 625, and a nonvolatile storage device 620. System 600 can be implemented in various ways. For example, an implementation as an integrated platform (such as a laptop computer, a tablet computer, a netbook computer, a server computer, a smart phone, a gaming device, a personal digital assistance device, etc.) may comprise CPU 605, memory 610, nonvolatile storage 620, and I/O devices 625. In such a configuration, components 605, 610, 620, and 625 may connect and communicate through a local data bus. I/O component(s) 625 may connect to external devices through a direct communication link (e.g., a hardwired, local wifi, or telephonic connection), through a network 625, such as a local area network (LAN) or a wide area network (WAN), and/or through other suitable connections. System 600 may be standalone or it may be a subsystem of a larger system or device.

CPU 605 may be one or more known processing devices. Memory 610 may be one or more fast solid-state devices configured to store instructions and information used and/or executed by CPU 605 to perform certain functions, methods, and processes related to embodiments of the present invention. Storage 620 may be a volatile or non-volatile, magnetic, semiconductor, tape, optical, or other type of storage device or computer-readable storage medium, including devices such as solid state memories, EEPROMS, hard disks, CDs and DVDs, meant for long-term storage.

In the illustrated embodiment, memory 610 contains one or more programs or subprograms 615, which may be loaded from storage 620 or from a remote system (not shown) that, when executed by CPU 605, perform various operations, procedures, processes, or methods consistent with the present invention. Alternatively, CPU 605 may execute one or more programs located remotely from system 600. For example, system 600 may access one or more remote programs via network 635 that, when executed, perform functions and processes related to or implementing embodiments of the present invention.

In some embodiments, memory 610 may include a program(s) 615 for identifying and processing pairs of non-mobile and mobile URLs and/or for generating rules for finding or determining a mobile URL corresponding to a given non-mobile URL, and/or vice versa. For example, memory 610 may include a program(s) 615 that implements methods or processes, such as process 200 of FIG. 2 and/or process 300 of FIG. 3 and/or processes, organizes, and stores data used to identify corresponding non-mobile and mobile URLS, such as the data shown in FIGS. 4 and 5. In some embodiments, memory 610 may also include other programs, subprograms, or applications that implement other methods and processes that provide ancillary functionality to the invention. For example, memory 610 may include subprograms that access, either locally or from various subsystems and external secondary devices, an index of non-mobile URLs or non-mobile web pages.

Memory 610 may be also be configured with other programs (not shown) unrelated to the invention and/or an operating system (not shown) that performs several functions well known in the art when executed by CPU 605. The choice of operating system, and even to the use of an operating system, is not critical to the invention.

I/O device(s) 625 may comprise one or more input/output devices that allow data to be received and/or transmitted by system 600. For example, I/O device 625 may include one or more input devices, such as a keyboard, touch screen, mouse, microphone, camera, and the like, that enable data to be input from a user. Further, I/O device 625 may include one or more output devices, such as a display screen, LCD screen, plasma display, speaker devices, and the like, that enable data to be output or presented to a user. I/O device 625 may also include one or more digital and/or analog communication input/output devices that allow computing system 600 to communicate, for example, digitally, with other machines and devices. For example, in the case of a server or similar device, I/O device 625 may include a wired or optical communication subsystem that allows system 600 to communicate with client devices via a network. Other configurations and/or numbers of input and/or output devices may be incorporated in I/O device 625.

In the embodiment shown, system 600 is connected to a network 635 (such as a cellular network, the Internet, a private network, a virtual private network, or other network), which may in turn be connected to various systems, devices, and/or computing machines (not shown in FIG. 6). In general, system 600 may input data from external machines and devices and output data to external machines and devices via network 635.

The exemplary embodiment shown in FIG. 6 includes a database 630, which is depicted as a standalone database external to system 600, such as, for example, a database 630 hosted on a server accessible by system 600. In other embodiments, database 630 may be hosted by, or be part of, system 600. In various embodiments, database 630 may manage and store data used to implement systems and methods consistent with the invention. For example, database 630 may store indexes of non-mobile URLs and/or mobile URLs. Database 630 may comprise one or more databases that store information and are accessed and/or managed through system 600. By way of example, database 630 may be implemented as a relatively complex relational database or as a table or other simple data structure. Systems and methods consistent with the invention, however, are not limited to the use of a database or data structure.

The foregoing disclosure provides examples of systems and methods for identifying and determining mobile URLs that correspond to non-mobile URLs and vice versa. It will be apparent to those skilled in the art that various modifications and variations can be made to the structures and methodologies described herein. Thus, it should be understood that the invention is not limited to the examples discussed in the specification. Rather, the present invention is intended to cover modifications and variations.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims. Moreover, the claims can encompass embodiments in hardware, software, or a combination thereof.

What is claimed is:

1. A computer-implemented method, comprising:
    identifying, by a processor, a first mobile URL, the first mobile URL associated with a mobile version of a first web page and corresponding to a first non-mobile URL, the first non-mobile URL associated with a non-mobile version of the first web page;
    determining, by the processor, one or more matching character strings between the first mobile URL and the first non-mobile URL, each matching character string including a common substring, the common substring appearing in both the first mobile URL and the first non-mobile URL and being at least a predetermined length;
    determining, by the processor and for each matching character string, a pattern specifying the matching character string;
    defining, by the processor and based on the patterns, a rule for generating, from an input non-mobile URL, an output mobile URL;
    applying the defined rule to a second non-mobile URL to generate a second mobile URL; and
    verifying that a webpage associated with the second mobile URL corresponds to a webpage associated with the second non-mobile URL.

2. The method of claim 1, the determining the one or more matching character strings comprising:
    dividing the first mobile URL into a first set of tokens based on URL delimiters and dividing the first non-mobile URL into a second set of tokens based on the URL delimiters; and
    determining that tokens from the first set match tokens from the second set.

3. The method of claim 1, the patterns represented as regular expressions.

4. The method of claim 1, wherein the verifying comprises:
    comparing at least a portion of content from a web page associated with the second non-mobile URL to at least a portion of content from a web page associated with the second mobile URL.

5. The method of claim 1, the second non-mobile URL from an index of a search service, the method further comprising adding the second mobile URL to the index.

6. The method of claim 1, further comprising:
    receiving, by the processor, a request directed to a search service, the generating the second mobile URL responsive to receiving the request;
    including the second mobile URL with a set of search results returned by the search service.

7. The method of claim 6, wherein including the second mobile URL with the set of search results comprises:
    prioritizing, for display, the second mobile URL in the set of search results.

8. The method of claim 1, further comprising:
    intercepting, by the processor and from an application at a mobile device, a request for a webpage associated with the second non-mobile URL, the generating the second mobile URL responsive to the intercepting; and
    sending a request for a webpage associated with the second mobile URL.

9. A non-transitory computer-readable medium including instructions that, when executed by a processor, perform operations comprising:
    identifying, by the processor, a first mobile URL, the first mobile URL associated with a mobile version of a first web page and corresponding to a first non-mobile URL, the first non-mobile URL associated with a non-mobile version of the first web page;
    determining, by the processor, one or more matching character strings between the first mobile URL and the first non-mobile URL, each matching character string including a common substring, the common substring appearing in both the first mobile URL and the first non-mobile URL and being at least a predetermined length;
    determining, by the processor and for each matching character string, a pattern specifying the matching character string;
    defining, by the processor and based on the patterns, a rule for generating, from an input non-mobile URL, an output mobile URL
    receiving a second non-mobile URL; and
    generating, using the rule and from the second non-mobile URL, a second mobile URL.

10. The non-transitory computer-readable medium of claim 9, the patterns represented as regular expressions.

11. A system comprising:
    at least one memory operatively coupled to at least one processor and configured for storing data and instructions that, when executed by the at least one processor, cause the system to:
    identify, by the processor, a first mobile URL, the first mobile URL associated with a mobile version of a first web page and corresponding to a first non-mobile URL, the first non-mobile URL associated with a non-mobile version of the first web page;

determine, by the processor, one or more matching character strings between the first mobile URL and the first non-mobile URL, each matching character string including a common substring, the common substring appearing in both the first mobile URL and the first non-mobile URL and being at least a predetermined length;

determine, by the processor and for each matching character string, a pattern specifying the matching character string;

define, by the processor and based on the patterns, a rule for generating, from an input non-mobile URL, an output mobile URL receive a second non-mobile URL; and generate, based on the rule and from the second non-mobile URL, a second mobile URL.

12. The system of claim 11, the determining the one or more matching character strings comprising:

dividing the first mobile URL into a first set of tokens based on URL delimiters and dividing the first non-mobile URL into a second set of tokens based on the URL delimiters; and determining that tokens from the first set match tokens from the second set.

13. The system of claim 11, the patterns represented as regular expressions.

14. The system of claim 11, the data and instructions further causing the system to:

verify that the second mobile URL generated based on the rule corresponds to the second non-mobile URL.

15. The system of claim 14, wherein the verifying comprises:

comparing content from a web page located by the second non-mobile URL to content from a web page located by the second mobile URL.

16. The system of claim 14, the second non-mobile index being from an index of a search service, the data and instructions further causing the system to:

add the second mobile URL to the index.

17. The system of claim 11, the generating the second mobile URL responsive to receiving a search request from a user to a search service, the data and instructions further causing the system to;

include the second mobile URL in a set of search results for presentation to the user.

18. The system of claim 11, the operations further comprising:

intercept, by the processor and from an application at a mobile device, a request for a webpage associated with the second non-mobile URL, the generating the second mobile URL responsive to the intercepting; and send a request for a webpage associated with the second mobile URL.

* * * * *